United States Patent [19]

Farris et al.

[11] Patent Number: 5,642,418
[45] Date of Patent: Jun. 24, 1997

[54] SATELLITE TELEVISION SYSTEM AND METHOD

[75] Inventors: Robert D. Farris, Sterling; Marcus F. Woody, Herndon; Dennis A. Minarczik, Oakton, all of Va.

[73] Assignee: Bell Atlantic Network Services, Inc., Arlington, Va.

[21] Appl. No.: 391,974

[22] Filed: Feb. 21, 1995

[51] Int. Cl.$^6$ .............................. H04L 9/08; H04N 7/167
[52] U.S. Cl. .................... 380/21; 380/10; 380/23; 455/3.1; 455/3.2; 455/5.1
[58] Field of Search ........................ 380/9, 10, 20, 380/21, 23, 25; 455/3.1, 3.2, 3.3, 9.1, 4.2, 5.1; 398/6, 7, 8, 10, 12

[56] References Cited

U.S. PATENT DOCUMENTS

| | | |
|---|---|---|
| 4,008,369 | 2/1977 | Theurer et al. . |
| 4,115,807 | 9/1978 | Pires . |
| 4,325,078 | 4/1982 | Seaton et al. . |
| 4,354,201 | 10/1982 | Sechet et al. . |
| 4,369,462 | 1/1983 | Tomizawa et al. . |
| 4,736,422 | 4/1988 | Mason ........................................ 380/20 |
| 4,763,191 | 8/1988 | Gordon et al. . |
| 4,797,913 | 1/1989 | Kaplan et al. . |
| 4,890,322 | 12/1989 | Russell, Jr. . |
| 4,897,867 | 1/1990 | Foster et al. . |
| 4,995,080 | 2/1991 | Bestler et al. ............................. 380/21 |
| 5,291,554 | 3/1994 | Morales ................................. 380/10 X |

*Primary Examiner*—Bernarr E. Gregory
*Attorney, Agent, or Firm*—Lowe, Price, LeBlanc & Becker

[57] ABSTRACT

A system for controlling the acquisition of encrypted program signals such as television or other signals utilizing existing equipment in use in telecommunications networks. The transmitted program signals are encrypted subject to decryption for presentation by a receiver such as a television receiver. A subscriber unit associated with the receiver receives the signals and is connected to the telecommunications network. The subscriber unit also receives program order commands from a subscriber and responsive to such a command transmits to the telecommunications network an order which enables the telecommunications network to identify the directory number to which the subscriber unit is connected and the number of the subscriber unit. Upon validation the telecommunications network returns to the subscriber unit a first decryption key which is stored in the subscriber unit. At substantially the same time the telecommunications network delivers to the program provider the order and identification of the ordering entity. The program provider returns via the telecommunications network to the subscriber unit a second decryption key and signal activating the first decryption key. Upon commencement of transmission of the ordered program an auxiliary signal is transmitted to the subscriber unit activating the second decryption key. The activation of both decryption keys and the use thereof provides decryption of the encrypted program signal and delivery of the decrypted signal to the television receiver. The signaling through the telecommunications network does not require call connection.

35 Claims, 3 Drawing Sheets

SATELLITE TELEVISION SYSTEM AND METHOD

TECHNICAL FIELD

This invention relates generally to broadcast and telecommunications systems and particularly to a system and method of controlling the acquisition of an encrypted program signal responsive to the order of a subscriber.

BACKGROUND ART

There has recently become available in the United States a television service utilizing a Digital Satellite System (DSS) to provide direct satellite to user transmission. The satellites are of a power sufficient to permit the use of antennas as small as 18 inch user mounted antenna dishes. A large number of channels are broadcast including non-premium, premium, and pay-per-view (PPV) access. PPV movies or video films are available starting as often as every 30 minutes for a fixed price per viewing.

A TV set top receiver translates the DSS stream into an analog signal fed to the television receiver. For pay-per-view and automatic billing services the receiver is connected to a telephone jack connected to the local exchange telephone network. A remote control is provided to permit users to switch through on-screen menus to select programming and order pay-per-view broadcasts. The program signal is generated by a video information provider (VIP) or program provider which broadcasts the DSS program signal through a suitable directional antenna system to one or more satellites. The satellite or satellites rebroadcast the signal down to the user's antennas. From the antenna the signal is fed to the user's set top receiver which translates the DSS digital stream into an analog signal connected to the television set. The receiver is connected to the local exchange telephone network. In order to provide simultaneous reception of two different DSS channels in a single premise a set top receiver is required for each TV.

In the distribution of pay-per-view program selections utilizing addressable converters/decoders (set top receivers) at the customer's television the customer desiring to receive such a program most often utilizes the telephone network to order the desired selection from the TV vendor or VIP. The program signal is encrypted or enciphered and the customer or subscriber is permitted access by providing to the customer the appropriate key for deciphering or decryption. The set top receiver incorporates the deciphering or decryption equipment and deciphers the signal of a selected channel for the receiving equipment. The subscriber unit or receiver may also require the delivery of additional signaling before it can perform the deciphering.

The ordering of the program signal by a subscriber may be on an annual, monthly or shorter term basis. It may also be on a "per program" basis. A control unit at a remote location can supply the subscriber unit with a deciphering key for specific ordered programs. Systems of this type are described, for example, in the following U.S. Pat. No. 4,008,369 issued Feb. 15, 1977 to Theurer et al; U.S. Pat. No. 4,115,807 issued Sep. 19, 1978 to Pires; U.S. Pat. No. 4,325,078 issued Apr. 13, 1982 to Seaton et al.; U.S. Pat. No. 4,354,201 issued Oct. 12, 1982 to Secket et al. and U.S. Pat. No. 4,369,462 issued Jan 18, 1983 to Tomizawa et al.

U.S. Pat. No. 4,890,322 to Thomas L. Russell, Jr. describes a system which includes a mechanism for delivering deciphering key information before deciphering can proceed.

The Russell, Jr. patent discloses a system for providing per program ordering of television programs using announcement distribution service equipment present in many existing telephone networks. A program producer 12 supplies a program signal to a TV network 14 for dissemination. Broadcast stations 16 transmit the signal by airwaves, cable (CATV), direct broadcast satellite, or other appropriate carrier to subscriber receiver units 18. Although the subscriber receiver units may receive other TV signals for normal display, the program signals for the per-program ordering system are enciphered to prevent reception and display by unauthorized receiver units.

Auxiliary signals contained in the retrace interval of the television signal are used to provide program information and program ordering instructions. Before ordering a program, a subscriber tunes to the appropriate channel and reviews the program information. To order The program, the subscriber operates an automatic call button 38 on the receiver unit 18, within a time period specified in the displayed information. In response, the receiver unit automatically dials a number assigned to the announcement distribution service equipment 21 in the telephone network 20. The announcement distribution service equipment 21 recognizes from the particular number dialed that the incoming call requires a particular order response. The announcement distribution service equipment 21 then connects the call to an announcement in the form of a low speed voiceband data signal which contains a deciphering key.

The receiver unit 18 receives and demodulates the low speed voiceband data signal to recover the deciphering key and stores the key in a memory associated with the particular program channel. The receiver unit 18 utilizes the deciphering key to decode the broadcast signal of the selected program. A later broadcast program will require a different deciphering key.

Other patents describing the ordering and supplying of television programs are described in the following U.S. Patents: U.S. Pat. No. 4,897,867 issued Jan. 30, 1990 to Foster et al. for a Method of and an arrangement for forwarding a customer order; U.S. Pat. No. 4,763,191 issued Aug. 9, 1988 to Gordon et al. for Dial-up Telephone Network Equipment for Requesting an identified selection; and U.S. Pat. No. 4,797,913 issued Jan. 10, 1989 to Kaplan et al. for Direct Telephone Dial Ordering Service.

SUMMARY OF THE INVENTION

The present invention provides a system and method for controlling the acquisition of encrypted program signals, such as television signals, utilizing as a transmission medium existing equipment available and in use in public switched telecommunications networks. The transmitted program signals are encrypted subject decryption for presentation by a television receiver. A subscriber unit associated with the receiver receives the signals and is connected to the communications network. The subscriber unit is provided with a program order command from a subscriber and responsive to such a command transmits to the telecommunications network a data signal order which enables the telecommunications network to identify the directory number to which the subscriber unit is connected and the number of the subscriber unit. This occurs without the necessity of establishing a call to or through the telecommunications network.

Upon validation of the order the telecommunications network returns to the subscriber unit a first decryption key which is stored in the subscriber unit in a deactivated condition. At substantially the same time the telecommunications network delivers to the program provider the order and identification of the ordering entity. The program provider returns via the telecommunications network to the subscriber unit a second decryption key and a signal activating the first decryption key. The second decryption key is in a deactivated condition. The transmission of this data signal occurs without the necessity of establishing a call to or through the telecommunications network.

Upon commencement of transmission of the ordered program an auxiliary signal is transmitted to the subscriber unit activating the second decryption key. The activation of both decryption keys places the subscriber unit in a decryption mode and permits decryption of the encrypted program signal and delivery of the decrypzed signal to the television receiver. The invention also comprehends the program provider providing additional security by periodically changing the encryption of the program signal while substantially simultaneously transmitting to all subscriber units a new second decryption key which enables all subscriber units to decrypt the program signal encrypted in the new form.

DISCLOSURE OF THE INVENTION

Figure 1:
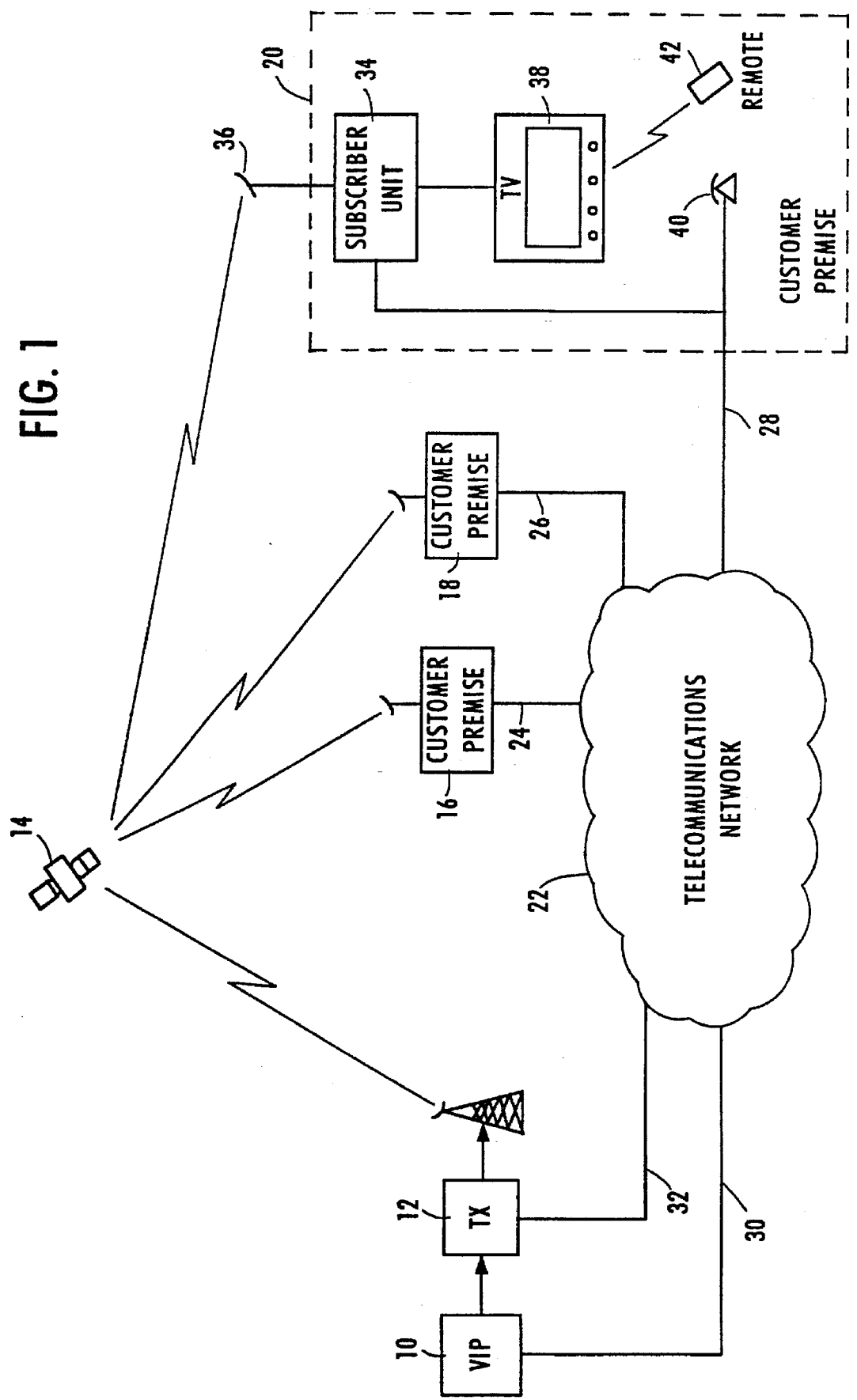
FIG. 1 is a diagrammatic drawing of a telecommunications system constructed according to the present invention which includes a telecommunications network and direct satellite broadcast delivery of television signals.

One example of a communications network in accordance with the present invention is illustrated in diagrammatic form in FIG. 1. In the network or system which is there shown a Video Information Provider (VIP) or program provider 10 provides program signals to a broadcast station 12. While only the single VIP 10 is shown providing input to the broadcast station in the figure, it will be appreciated that the broadcast station may and usually does receive program material from multiple program providers. The broadcast station sends the program signal via one or more satellites 14 which, in a direct satellite system, rebroadcasts the signals to suitable antennas at customer premises 16, 18 and 20.

The customer premises are connected to a telecommunications network 22 which may be a Public Switched Telephone Network (PSTN), which in turn may be a Local Exchange Carrier (EEC). Such connections may be made by conventional local loops indicated at 24, 26 and 28. The video information provider and broadcasting station are also connected to the telecommunications network by local loops 30 and 32, although it will be understood that other types of telephone connection may be used in all instances, such as T1, ISDN, dedicated line, etc. It is a feature of the invention that the local loop connections are terminated at each end in voice/data multiplexers or modems.

Referring to the customer premise indicated at 20, each customer premise which is a subscriber to the service is provided with a subscriber unit 34 which is connected to the antenna 36. In some applications there may be signal conversion equipment, filters, amplifiers, or such between the antenna 36 and the subscriber unit 34. The subscriber unit may receive many different program signals associated with different frequency channels and one or more of these signals may be in an encrypted form, while others may be unencrypted and therefore available to the general public without charge.

The present invention is directed to the handling of encrypted program signals. The subscriber unit 34 is connected to the television of TV receiver 38 and is also connected to the local loop 28 which may serve a plain old telephone (POTS) terminal 40. The voice/data multiplexer is preferably provided in the subscriber unit as will be described. The TV receiver 38 may be provided with a remote control 42 suitable for controlling the TV via infrared radiation in a conventional manner. It will be understood that the terminal 40 need not be a POTS terminal nor a telephone.

In the illustrated communications system, the programs broadcast by the satellite 14 contain not only the program signals, but also auxiliary signals carried within the retrace interval of the signal in a technique which is understood by those skilled in the television broadcast art. These auxiliary signals may include control and display signals usually in the form of digital information. Such auxiliary signals may supply program information which may appear on the television display or on a separate display which may be provided on the subscriber unit in a manner known in the art. Each of the available channels may have such display information provided with its program signals, so that this display information may be selected by the subscriber as desired by appropriate selection of channel. If the subscriber wishes to order a program being offered, he need only operate an order/call button provided on the remote 42 within the time period specified by the displayed information. This will initiate an order sequence within the subscriber unit 34 presently to be described in further detail.

The culmination of the order sequence may be triggered by an appropriate control message provided in the auxiliary signal which activates the final decryption key and causes the subscriber unit to commence decryption. As also will be described in further detail hereinafter, the order sequence includes the initiation of a data signal by the subscriber unit 34 to the telecommunications network 22 over the local loop 28 without requiring the initiation of a call to the communications network or the establishment of an off-hook condition on the subscriber line or local loop 28. The order signal will provide the telecommunications network with sufficient information to identify both the identity of the directory number of the local loop 28 as well as the identification of the particular subscriber unit 34. This identification does not require the connection of a call to generate ANI information.

On making such identification, the telecommunications network returns to the subscriber unit a response over the local loop which contains a first decrypnion key. The key information may be in the form of digitally encoded numerical values which can be used to set the coefficients of a signal filter. The response may also display information or operational control information of a nature similar to that contained in the auxiliary signal received from the antenna. The telecommunications network returns the response and first decryption key to the subscriber unit 34 only after the identity of the directory number and subscriber unit have been validated in a database maintained in the telecommunications network. This database may be an existing database or storage associated with an SCP or ISCP, or alternatively may be a storage associated with an Intelligent Peripheral (IP).

Upon such validation, the telecommunications network also initiates a data signal to the VIP 10 or program provider over the link 30. The VIP 10 upon receipt of that signal returns through the telecommunications network a data signal to the subscriber unit 34 which contains a second decryption key and a control signal which activates the first key previously supplied by the telecommunications network. The local loop 30 from the telecommunications network to the ViP or program provider terminates at each end in a voice/data multiplexer or modem. The subscriber unit 34 is now prepared to deencrypt the program signal upon actuation of the second decryption key on command at the time that such command is delivered to the subscriber unit 34.

At the start of the ordered program, the control signals which are in the auxiliary signal delivered with the encrypted program signal instruct the second decryption key and associated circuitry to become active. When both the first and second decryption keys and associated circuitry are activated the subscriber unit 34 is able to decrypt the program signal and provide the decrypted signal to the TV receiver 38. As will be understood by those skilled in the art, there are a large number of encryption and decryption methods known in the art which readily lend themselves to this system.

A feature of the invention is the manner of usage of a telecommunications network having a common channel signaling system with the subscriber connections and associated voice/data multiplexers or modems. The arrangement permits ordering and the enablement of decryption to occur without the necessity of call establishment. The flow of data to the subscriber unit may occur without ringing of an associated telephone through the use of a NO ring trunk in the telecommunications network such as occurs in telemetering in a manner known to those skilled in the art. This feature permits the program providers to periodically change the encryption code, such as every 30 minutes, and to signal the change to the subscriber units and provide new second keys and activation signals through the telecommunications network without establishing a call or causing a subscriber telephone to ring. A system suitable for use with the invention is illustrated in FIG. 2.

Figure 2:
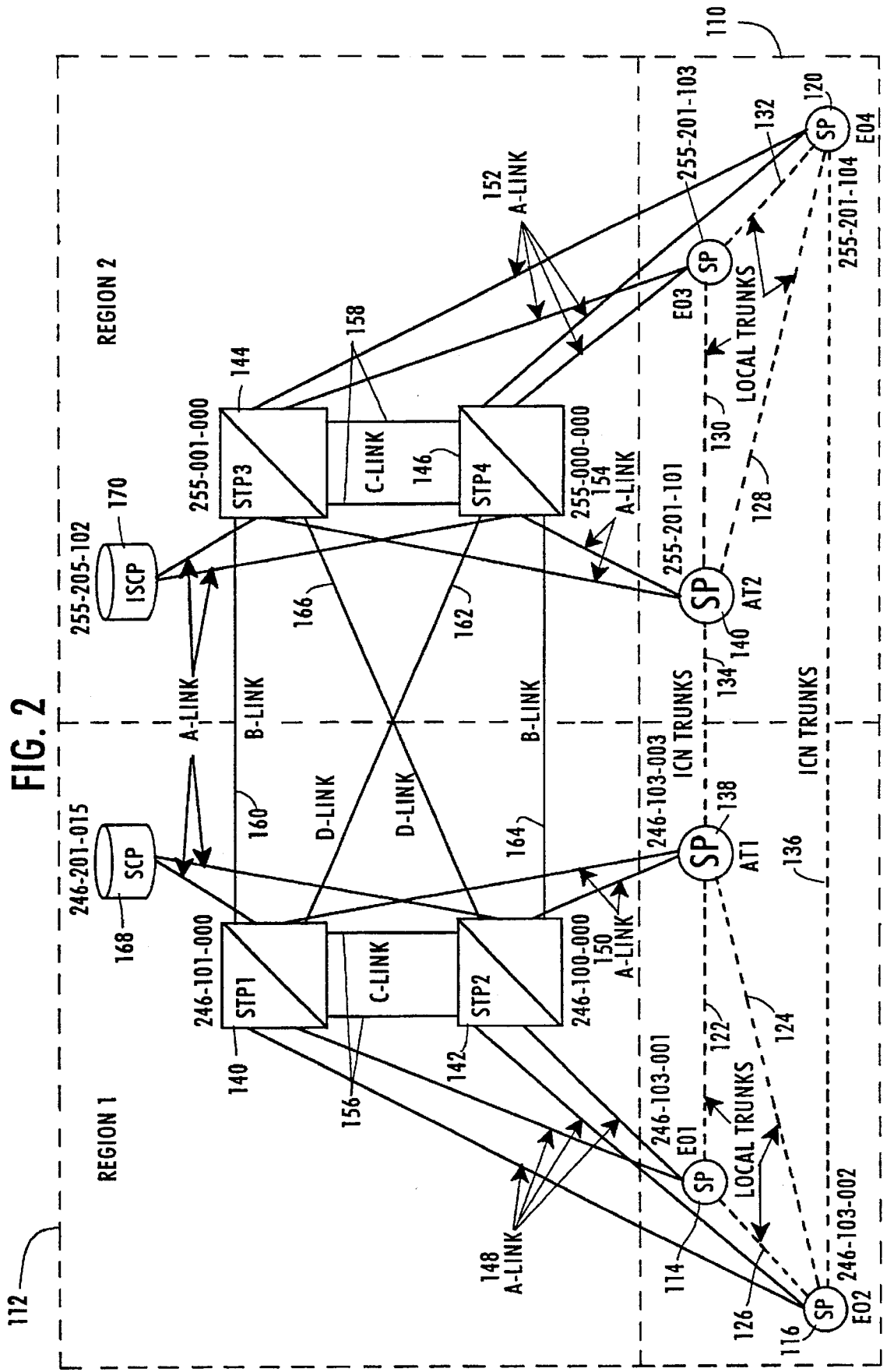
FIG. 2 is a block diagram of a public switched telephone network utilizing common channel signaling in the form of an SS7 network.

Referring to FIG. 2 there is shown a system for providing a Common Channel Signaling Network (CCSN) utilizing Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP's) used to permit line identification database (LIDB) look-up for 800 services, Class services also use the SS7 network to provide custom call features. The latest services, using the SS7 network comprise Advanced Intelligent Network (AIN) services. AIN services use the SS7 network to access an Integrated Switching Control Point (ISCP) where AIN service functions are performed, Referring to FIG. 2 there is shown a block diagram of a public switched telephone network and the SS7 network that is used to control the signaling for the switched network, Thus an analog switched telephone network is generally indicated at 110 having a common channel signaling network in the form of an SS7 network illustrated generally at 112. The switched telephone network consists of a series of central offices which are conventionally referred to as signaling points (SP's or SSP's) in reference to the SS7 network. Certain of these SPs comprise end offices (EOs) illustrated at 114, 116, 118 and 120 as Eos 1–4 in FIG. 2. Each signaling point has a point code comprising a 9-digit code assigned to every node in the network. In FIG. 2 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. Each operating company has its own network ID, shown here as 246 for the left region and 255 for the right region in FIG. 2. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines connecting the SPs together may be analog trunks or voice or similar circuits. The SPs in a given region are connected together by local trunks 122, 124 and 126 in the left region and 128,130 and 132 in the right region. The SPs in one region are connected to the SPs in other regions via inter-exchange carrier network trunks or ICN trunks 134 and 136 in FIG. 2 connected to Access Tandems (ATs) 138 and 140 (AT1 and AT2). These SPs or ATs are shown as having point codes 246-103-003 and 255-201-101 respectively.

Referring to FIG. 2, the SS7 network 112 comprises a series of Signal Transfer Points (STPs) shown here at 140, 142, 144 and 146 designated STP1, STP2, STP3 and STP4. Each STP in a network is connected to the SPs in the network by A links indicated at 148, 150, 152 and 154. STP1 and STP2 constitute a mated pair of STPs connected by C links 156 while STP3 and STP4 constitute a mated pair connected by C links 158, each mated pair serving its respective transport area. It will be understood that there may be multiple mated pairs per region, one for each designated transport area. STP1 is connected to STP3 by B link 160 and to STP4 by D link 162. STP2 is connected to STP4 by B link 164 and to STP3 by D link 166.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message S routing. The STP pair cannot function without the C links. Therefore, unnecessary utilization of the C links causes congestion and prevents the paired STPs from performing their intended function.

The STPs are connected to Signal Control Points (SCPs) indicated in FIG. 2 as an SCP 168 and an ISCP 170. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 162 to STP4 to EO4, and so forth. In the event that a link between STP3 and EO4 was lost, an SS7 route could be established from EO2 to EO4 via STP1 to STP3 and then via C link 158 to STP4 to EO4. However, that would be an undesirable route in unnecessarily using the C link. A links provide direct connectivity while C links provide circuitous routes using extra switches, a situation to be avoided. An alternate route would be from STP1 via D link 162 to SSTP4 to EO4. Another reason for not using the C link is to avoid tying up the entire STP3–STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Part (SCCP) message, which is a database request. This point code has a destination point code of an alias which is the point code of STP1 and STP2. STP1 and STP2 have various point codes indicated in FIG. 2 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN. It is one or more of these databases which are utilized for the purposes of the present invention.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control, or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages of various length that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figure 3:
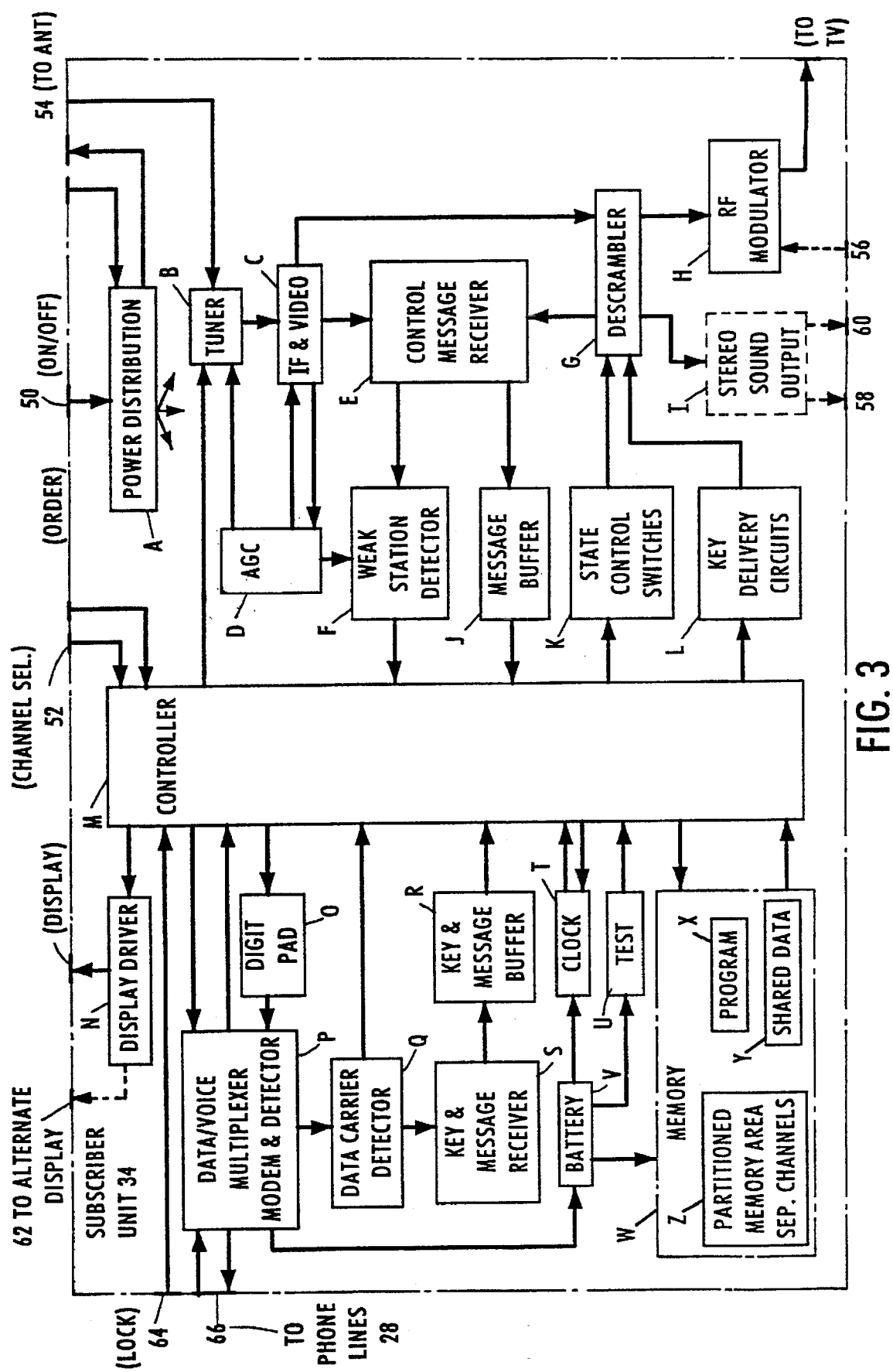
FIG. 3 is a block diagram of the subscriber unit of FIG. 1.

FIG. 3 is a partially pictorial functional block diagram of the subscriber unit 34. The sub-units A–L illustrated on the right side of the unit are largely concerned with the reception and decryption of the television signal, while the sub-units N–Z on the left side are largely concerned with the telephone connection and the reception and processing of the decryption keys and related messages. The functional details of the sub-units can be readily supplied by those skilled in the art.

Power is delivered through a power supply sub-unit A under the control of the switch 50. Sub-units B, C and D provide standard television receiver functions of tuning, IF and Video Amplification and automatic gain control. Sub-unit B is an electronic tuner which receives channel changes indirectly via controller M, rather than directly from the channel selector 52, which may be the mechanical channel selector switch or a selector controlled by the remote 42.

The receiver sub-unit E takes the output of the amplifier C and extracts auxiliary signals from those retrace interval lines which have subscription television header signals. These auxiliary signals are formed into control messages and then output to the message buffer J for use by the controller sub-unit M.

The control message receiver E reports message format and parity errors to the weak station detector F which measures both the AGC output level and the message error rate to determine if a weak signal condition must be reported to the controller M.

It is the principal function of the tuner B and the amplifier C to prepare the television signal as it appears at input 54 for decryption circuitry in the form of a descrambler G. The descrambler G has two sets of input leads controlling its operation: first, those from the state control switches as set by sub-unit K; and second, the decryption key inputs as delivered by the key delivery sub-unit L. The circuits within descrambler G are set to either by-pass or use the descrambling logic upon command from the state control switch K. The descrambler G resets to the by-pass state whenever it is not receiving power from sub-unit A.

The first and second decryption keys are delivered to the descrambler G to cause it to operate in the proper mode and with the proper timing for deciphering the television signal. The decrypted signal is delivered to the RF modulator sub-unit H for conversion to a proper signal for use by the subscriber's television receiver 38. An adjustment 56 is provided for the sub-unit H to set the output channel, typically to VHF Channel 3 or 4. A portion of the decrypted signal is also delivered to an optional sub-unit I, which separates and amplifies stereo sound output signals and delivers those signals to the optional ports 58 and 60 for connection into the subscriber's sound system. In addition, the descrambler G output is in part delivered to the control message receiver E for purposes of receiving encrypted control messages and thereby testing the performance of the descrambler G.

The controller M receives signals of changes of condition within subscriber unit 34 and then responds by taking the appropriate action as determined by its associated programs. For example, the controller M may be alerted to an arriving message by sub-unit J; that message may be "display text" message. Controller M will then use its display programs to convert the message data to display data for output to the display driver sub-unit N. The display driver N then creates the appropriate text on an optional external display panel (not shown) and also on the auxiliary data output port 62. The message data may also be displayed on the TV receiver display in a manner known to those skilled in the art.

The controller M notes the position of a suitable mechanical switch lock 64 whenever the subscriber activates the auto-call button on the remote or the channel select switch 52. Lock 64 can thus be used to prevent the ordering of any program signals, i.e., the subscriber unit 34 must be "unlocked" to allow program signals to be ordered. Similarly, lock 64 can be used to enable or disable program viewing on certain program channels. The subscriber enables the desired channels by placing lock 64 in a "channel enable" position and using the channel selection switch 52. Controller M will cause the display to indicate the channel numbers in their enabled/disabled state in response to the subscriber selections.

The data/voice multiplexer and detector modem P and the digit output PAD O provide for an alternate ordering technique. According to such a procedure, the customer may order a program by entering digits identifying the program. The digits may be obtained from an on-screen or other display or from a periodically published program directory. If an order is inputted in this fashion the digits are assembled into a data packet which is fed through the data/voice multiplexer and modem to the subscriber line and thence to a mating data/voice multiplexer modem in the central office in which the subscriber line connects with the network, such as the SP 120, in FIG. 2, by way of example. The data/voice multiplexer and detector modem P is connected to the subscriber line directly through connection 66. In this manner, the order signal is delivered, whether by digit insertion or button depression as previously described, without establishing a call connection and without establishing an off-hook condition on the subscriber line. As a result, the telephone terminal 40 at the customer premise may be utilized simultaneously with the transmittal of an order over the same subscriber line. This elimination of the requirement to connect a call provides a significant improvement in the order handling capacity of the communications system.

The data carrier detector Q, the key and message buffer R, and the key and message receiver S together create the receive portion of a low-speed data modem.

The controller M, the memory W, and the clock T are preferably supplied with back-up battery power V. Backup power supplied to the controller M via a power test sub-unit U which alerts the controller of low battery condition. Power to restore the battery is delivered from sub-unit A when the subscriber unit 34 is on, and from sub-unit P when it is off.

The memory sub-unit W provides both RAM and ROM functions. The program sub-unit X contains the programs and permanent data such as the unit serial number needed for operation of the subscriber unit 34. The shared data sub-unit Y stores transient data which may be shared by any and all program channels. This is to be contrasted with the data stored in the partitioned memory area Z, such as the address to be accessed to subscribe to a forthcoming program. Controller M assigns areas within memory Z based on the appearance of control messages in message buffer J whenever a channel selector 40 change is made by the subscriber. All data pertaining to orders for programs is kept segregated by channel within memory Z.

Preferably each channel that is enabled and transmitting a control signal is allocated a section of memory Z by the subscriber unit 34 when it notes the presence of both the enabling and control signals. There is no cross-access within memory Z between broadcasting stations. Moreover, each channel has memory in areas accessible only to commands received in the auxiliary signal or via the telephone line, respectively.

The program signal is not limited to one of a particular frequency or carried by a particular medium. It may be a television, radio, or other frequency signal. The encryption scheme may take any appropriate form which is suitable for the transmission of separate decryption keys in the form of electronically transmitted messages capable of being stored in the subscriber unit. The program signal need be accompanied only by a control signal for activating the decryption. The display data signal is optional. The accompanying control signal may be transmitted to the subscriber unit in any suitable form so long as it bears an appropriate time relationship with the program signal to permit the activation of the decryption contemporaneously with the starting period of the program. While it is convenient to carry the control signal on the same channel and with the program signal, this is not essential, and the control signal can be supplied by other carrier means if that is preferable.

The manual lock on the subscriber unit can deny program orders while neither denying viewing nor cancelling orders already placed. Under certain circumstances, it may be desirable to equip the subscriber unit with a mechanism for disabling the ordering capability if the unit senses that the program signal from the program channel is too weak to yield an acceptable rendition of the program or would be likely to result in errors in the control signals. The unit may also include a memory for recording the lengths of time that an unsatisfactory signal is received. This information can be automatically accessed at a future time and used by the television network to control future ordering or possibly as the basis for a refund.

The information for display can appear on the television screen in the "caption" area at the top or bottom of the screen instead of on a subscriber unit or on both. The display on the unit or otherwise external of the television picture can take various forms. It may, for example, be by a printing mechanism connected to the subscriber unit as a slave.

The connection of the subscriber unit to the subscriber line can be adapted to be cordless.

The operation of the system in handling an illustrative ordering sequence may be described as follows:

The subscriber enters an order for a program by depressing a button on the remote in response to and in time with instructions appearing on the TV monitor. Alternatively the subscriber may key in the appropriate digits to signify the desired program and start time. The subscriber unit forms this entry into a suitable data signal transmitted through the data/voice multiplexer or modem to the subscriber premise local loop or subscriber line to the telecommunications network end office or Signaling Point (SP). The data signal passes through a second voice/data multiplexer or modem at this point. The signaling point translates this data signal into a TCAP message to the SCP or ISCP having a storage containing the data regarding the identity and qualifications of both subscribers (directory numbers) and subscriber units.

Different directory numbers may have different qualifications, i.e. subscribe to different services, and different subscriber units associated with those directory numbers may have varying qualifications. Thus it is possible to limit the qualifications of one subscriber unit in a given premise while permitting another subscriber unit to have broader qualifications such as to receive adult programming.

The signal is transmitted from the signaling point (SP) to this storage via the SP, STP, SCP links described in detail in relation to FIG. 2. Assuming that the order meets the qualifications ascertained from accessing the storage or database, the SCP forms an order message for delivery to the VIP or program provider. This message proceeds via the common channel signaling network STP's and SP and subscriber loop to the VIP or program provider. Further qualifications of the subscriber may be checked at either the storage associated with the SCP and/or a storage maintained by the VIP or program provider. Billing may occur either through records maintained by the SCP and its associated equipment or the VIP or program provider in a manner known to those skilled in the art. The VIP or program provider may check still further qualifications of the subscriber if desired. Upon satisfying such qualifications the VIP or program provider returns a data message over the subscriber line to the telecommunications network where it proceeds back through the SP's and STP's to the subscriber line to the customer premise and subscriber unit. This communication occurs without the necessity of establishing a call to or through the telecommunications network.

When the SCP completes its validation of the subscriber and subscriber unit, it also accesses its storage to form a message to the subscriber unit containing the first decryption key. That message to the subscriber unit is dispatched at substantially the same time that the SCP dispatches the message to the VIP or program provider. The message containing the first decryption key is received by the subscriber unit and stored in the storage provided for that decryption key. The key is at that time in a non-activated condition. When the VIP or program provider satisfies its qualification base or storage regarding the order, it dispatches to the subscriber unit a data message containing the second decryption key and an order to activate the first but not the second decryption key. The subscriber unit at this time contains an activated first key and an inactive second key. At the time that the ordered program commences, an auxiliary signal is transmitted along with the encrypted program signal and that auxiliary signal activates the second decryption key. Both decryption keys are now activated and decryption of the encrypted signal commences. The decrypted signal is fed to the television receiver and the customer receives the ordered program.

If the VIP or program provider desires a still further degree of encryption security, it may at periodic intervals, such as every 30 minutes, cause the transmitter to change the encryption code. Substantially simultaneously the VIP or program manager transmits to the subscriber units a new second encryption key which permits decryption of the new encryption code. This occurs without the necessity of establishing a call to or through the telecommunications network and without ringing the telephone which may be associated with the subscriber line at the customer premise.

It will be readily seen by one of ordinary skill in the art that the present invention fulfills the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of controlling the acquisition of an encrypted program signal of a program provider by at least one subscriber unit, said encrypted program signal being transmitted over a predetermined transmission path, said method comprising the steps of:

receiving a program order signal from said at least one subscriber unit via a telephone link, responding to said order signal by returning over said telephone link a predetermined first decryption key, signaling said program provider, and returning to the ordering subscriber unit a second decryption key determined by said program provider, transmitting thereafter over said predetermined transmission path said encrypted program signal for receipt by said at least one subscriber unit in a form decryptable by said unit using said first and second decryption keys.

2. A method according to claim 1 wherein said telephone link includes a local loop from a telephone switch to the premise of said subscriber unit, and said order signal is received without creating an off hook condition on said local loop at said premise.

3. A method according to claim 1 wherein said order signal and at least said second decryption key travel different telephone links to a local loop to the premise of said subscriber unit.

4. A method according to claim 1 including transmitting said order signal and said decryption keys to and from a local loop to the premise of said subscriber unit over a common channel signaling network associated with a switched telephone network connected to said local loop.

5. A method according to claim 4 wherein said first decryption key is obtained from storage means comprising part of said common channel signaling system.

6. A method according to claim 4 wherein said second decryption key is obtained from storage means controlled by said program provider.

7. A method according to claim 1 including the steps of identifying the directory number of a local loop comprising at least part of said telephone link with the premise of said ordering subscriber unit and the identity of the ordering subscriber unit which originated the order signal.

8. A method according to claim 7 including the steps of accessing a storage to determine the eligibility of the subscriber associated with said directory number and the ordering subscriber unit to receive the ordered program, and sending said decryption keys only if the eligibility of both is established.

9. A method according to claim 1 including the steps of periodically changing said encryption of the program signal and substantially simultaneously providing to subscriber units having the previously valid decryption keys at least one new key to enable decryption of the newly encrypted program signal.

10. A method according to claim 9 wherein said at least one new key is provided by the program provider.

11. A method according to claim 10 including the step of providing said new key without requiring the establishment of an off hook condition at the premises of said subscriber unit.

12. In a switched communications network comprising:
a first central office switching system connected to subscriber telephone lines connected to subscriber premise terminals including at least one service switching point for selectively providing switched communications between subscriber telephone lines;
a second central office switching system connected to subscriber telephone lines connected to subscriber premise terminals including at least one service switching point for selectively providing switched communications between subscriber telephone lines;
a network controller arranged separately from the central office switching systems and being connected to at least the service switching points connected to said central office switching systems through at least one service transfer point arranged to convey control data to effect communications, said network controller storing preprogrammed call processing data associated with subscribers who are associated with the subscriber telephone lines connected to consumer premise terminals connected to the central office switching systems; a method of controlling the acquisition of an encrypted program signal of a program provider by at least one programs subscriber unit, said encrypted program signal being transmitted over a predetermined transmission path, said method comprising the steps of:
receiving a program order signal from said at least one subscriber unit via a subscriber telephone line and service transfer point,
responding to said order signal by returning over said subscriber telephone line a predetermined first decryption key, signaling said program provider via at least one service transfer point, and returning to the ordering subscriber unit via at least one service transfer point and said subscriber telephone line a second decryption key determined by said program provider,
transmitting thereafter over said predetermined transmission path said encrypted program signal for receipt by said at least one subscriber unit in a form decryptable by said unit using said first and second decryption keys.

13. A method according to claim 12 wherein said order signal is transmitted without creating an off hook condition on the subscriber telephone line to the premise of the ordering subscriber unit.

14. A method according to claim 12 wherein said order signal and at least said second decryption key travel different telephone links to said subscriber telephone line to the premise of said ordering subscriber unit.

15. A method according to claim 14 wherein said first decryption key is obtained from storage means associated with said network controller.

16. A method according to claim 15 wherein said second decryption key is obtained from storage means controlled by said program provider.

17. A method according to claim 12 including the steps of identifying the directory number of the subscriber telephone line to the premise of said ordering subscriber unit and the identity of the ordering subscriber unit which originated the order signal.

18. A method according to claim 17 including the steps of accessing a storage associated with said network controller to determine the eligibility of the subscriber associated with said directory number and the ordering subscriber unit to receive the ordered program, and sending said decryption keys only if the eligibility of both is established.

19. A method according to claim 12 including the steps of periodically changing said encryption of the program signal and substantially simultaneously providing to subscriber units having the previously valid decryption keys at least one new key to enable decryption of the newly encrypted program signal.

20. A method according to claim 19 wherein said at least one new key is provided by the program provider.

21. A method according to claim 20 including the step of providing said new key without requiring the establishment of an off hook condition at the premises of said subscriber unit.

22. A communications network including a telephone network comprising:
means for receiving a program signal in an encrypted form from a program provider;
decryption means having decryption key storage having a capacity for storing two decryption keys for decrypting the program signal and sending it to a receiver device;

means for controlling the activation of the decryption keys;

means for storing a request to order said program signal;

means responsive to receipt of said order for said program signal for establishing at least a virtual link through said telephone network with a network controller for said telephone network and for receiving from said network controller via said telephone network a first decryption key:

means responsive to receipt of said order for said program signal for establishing at least a virtual link through said telephone network with said program provider and for receiving from said program provider a second decryption key, and on receipt of said second key activating said first key;

means responsive to receipt of an activation signal delivered with said encrypted program signal for activating said second key whereupon said decryption means decrypts said encrypted program signal.

23. A communications network including a telephone network comprising:

means for receiving a program signal in an encrypted form from a program provider;

decryption means having decryption key storage having a capacity for storing two decryption keys for decrypting the program signal and sending it to a receiver device;

means for controlling the activation of the decryption keys;

means for storing a request to order said program signal;

means responsive to receipt of said order for said program signal for establishing a virtual link through said telephone network with a network controller for said telephone network and for receiving from said network controller via said virtual link in said telephone network a first decryption key:

means responsive to receipt of said order for said program signal for establishing a virtual link through said telephone network with said program provider and for receiving from said program provider a second decryption key;

means responsive to receipt of an activation signal delivered with said encrypted program signal for activating at least one of said decryption keys whereupon said decryption device decrypts said encrypted program signal.

24. A communications network including a telephone network comprising:

means for receiving a program signal in an encrypted form from a program provider;

decryption means having decryption key storage having a capacity for storing two decryption keys for decrypting the program signal and sending it to a receiver device;

means for controlling the activation of the decryption ability of the decryption means;

means for storing a request to order said program signal;

means responsive to receipt of said order for said program signal for establishing at least a virtual link through said telephone network with a network controller for said communications network and for receiving from said network controller via at least a virtual link in said telephone network a first decryption key:

means responsive to receipt of said order for said program signal for establishing at least a virtual network through said telephone network with a decryption key source and for receiving from said decryption key source a second decryption key;

said decryption means decrypting said encrypted carrier signal with said decryption keys and delivering decrypted program signal to said receiver device.

25. In a switched communications network comprising:

a first central office switching system connected to subscriber telephone lines connected to subscriber premise terminals including at least one service switching point for selectively providing switched communications between subscriber lines;

a second central office switching system connected to subscriber telephone lines connected to subscriber premise terminals including at least one service switching point for selectively providing switched communications between subscriber telephone lines;

a network controller arranged separately from the central office switching systems and being connected to at least the service switching points connected to said central office switching systems through at least one service transfer point arranged to convey control data to effect communications, said network controller storing preprogrammed call processing data associated with subscribers who are associated with the subscriber telephone lines connected to consumer premise terminals connected to the central office switching systems; an improved system for controlling the acquisition of an encrypted program signal of a program provider by at least one program subscriber unit, said encrypted program signal being transmitted over a predetermined transmission path, said system comprising:

means for receiving a program order signal from said at least one subscriber unit via a subscriber line and service transfer point, means associated with said network controller for responding to said order signal by (a) returning over said subscriber telephone line a predetermined first decryption key, (b) signaling said program provider via at least one service transfer point, and (c) returning to the ordering subscriber unit via at least one service transfer point and said subscriber telephone line a second decryption key determined by said program provider, means for transmitting thereafter over said predetermined transmission path said encrypted program signal for receipt by said at least one subscriber unit in a form decryptable by said unit using said first and second decryption keys.

26. A system according to claim 25 wherein said order signal is received at said service transfer point without creating an off hook condition on said subscriber telephone line.

27. A system according to claim 25 wherein said order signal and at least said second decryption key travel different routes to said subscriber telephone line.

28. A system according to claim 25 including transmitting said order signal and said decryption keys to and from said subscriber telephone line over a common channel signaling network associated with the switched telephone network connected to said subscriber telephone line.

29. A system according to claim 28 wherein said first decryption key is obtained from storage means associated with said network control.

30. A system according to claim 29 wherein said second decryption key is obtained from storage means controlled by said program provider.

31. A system according to claim 25 including means for identifying the directory number of said subscriber telephone line of said ordering subscriber unit and identifying the ordering subscriber unit which originated the order signal.

32. A system according to claim 25 including means associated with said network controller for accessing a storage to determine the eligibility of the subscriber associated with said directory number and the ordering subscriber unit to receive the ordered program, and sending said decryption keys only if the eligibility of both is established.

33. A system according to claim 25 including means associated with the program provider for periodically changing said encryption of the program signal and substantially simultaneously providing to subscriber units having the previously valid decryption keys at least one new key to enable decryption of the newly encrypted program signal.

34. A system according to claim 33 wherein said at least one new key is provided by the program provider.

35. A system according to claim 34 wherein said new key is provided without requiring the establishment of an off hock condition on said subscriber telephone line.

* * * * *